US006518213B1

(12) United States Patent
Yamamoto et al.

(10) Patent No.: US 6,518,213 B1
(45) Date of Patent: Feb. 11, 2003

(54) EXHAUST GAS PURIFYING CATALYST AND PROCESS FOR PREPARING THE CATALYST

(75) Inventors: Shinji Yamamoto, Yokosuka (JP); Masahiro Takaya, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 104 days.

(21) Appl. No.: 09/617,489

(22) Filed: Jul. 14, 2000

(30) Foreign Application Priority Data

Aug. 6, 1999 (JP) .......................................... 11-224600
Jul. 6, 2000 (JP) ....................................... 2000-205381

(51) Int. Cl.⁷ ....................... B01J 29/068; B01J 29/12; B01J 29/22; B01J 29/44; B01J 29/74
(52) U.S. Cl. ............................ 502/65; 502/64; 502/66; 502/71; 502/74; 502/77; 502/79
(58) Field of Search ........................... 502/64, 66, 71, 502/74, 77, 79, 340, 344, 328, 330, 339, 325, 304, 302, 303, 65

(56) References Cited

U.S. PATENT DOCUMENTS

| | | | |
|---|---|---|---|
| 4,727,052 A | 2/1988 | Wan et al. | .................. 502/327 |
| 5,147,842 A | 9/1992 | Funabiki et al. | ............. 502/304 |
| 5,200,384 A | 4/1993 | Funabiki et al. | ............. 502/304 |
| 5,772,972 A | 6/1998 | Hepburn et al. | ......... 423/213.5 |
| 5,958,828 A * | 9/1999 | Murakami et al. | .......... 502/304 |
| 6,047,544 A | 4/2000 | Yamamoto et al. | ........... 60/285 |
| 6,066,587 A | 5/2000 | Kurokawa et al. | ............ 502/66 |

FOREIGN PATENT DOCUMENTS

| | | | |
|---|---|---|---|
| DE | 197 42 705 A1 | | 4/1998 |
| EP | 0 485 180 A1 | | 5/1992 |
| EP | 0 749 774 A2 | | 12/1996 |
| EP | 0 848 984 A1 | | 6/1998 |
| EP | 0 904 827 | * | 3/1999 |
| JP | 58-20307 | | 4/1983 |
| JP | 2-135126 | | 5/1990 |
| JP | 3-141816 | | 6/1991 |
| WO | 00/59630 | | 10/2000 |

* cited by examiner

*Primary Examiner*—Stanley S. Silverman
*Assistant Examiner*—Christina Ildebrando
(74) *Attorney, Agent, or Firm*—Foley & Lardner

(57) ABSTRACT

An exhaust gas purifying catalyst comprises a hydrocarbon adsorbent layer and a metal-based catalyst layer on a monolithic support. The catalyst contains zeolite in the underlying hydrocarbon adsorbent layer and contains noble metals such as palladium, platinum, rhodium, etc. in the overlying metal-based catalyst layer. Also, both layers contain an alkaline metal, etc., and a weight ratio of the alkaline metal, etc. contained in the metal-based catalyst layer to the alkaline metal, etc. contained in the hydrocarbon adsorbent layer is set to 60:40 to 99:1. A process for preparing the above catalyst comprises forming the metal-based catalyst by coating slurry. The slurry contains water insoluble or water hardly-soluble alkaline metal and/or alkaline earth metal compound.

15 Claims, 4 Drawing Sheets

FIG. 3

TABLE 1

| | ZEOLITE | SUPPORTED METAL ON ZEOLITE | NOBLE METAL AMOUNT Pd(g/L) | Pt(g/L) | Rh(g/L) | ALKALINE OR ALKALINE EARTH METAL SALT IN A METAL-BASED CATALYST LAYER (OXIDE CONVERSION):X (g/L) | X/ALL ALKALINE OR ALKALINE EARTH METAL SALT (%) | NUMBERS OF CELLS/ THICKNESS (NOS. OF CELLS / 6 mil) | PH OF SLURRY FOR A METAL-BASED CATALYST LAYER |
|---|---|---|---|---|---|---|---|---|---|
| EXAMPLE #1 | β | — | 4.71 | 0.471 | 0.471 | 24 | 80 | 300 | 5.8 |
| EXAMPLE #2 | β | — | 4.71 | 0.471 | 0.471 | 27 | 90 | 300 | 5.6 |
| EXAMPLE #3 | β | — | 4.71 | 0.471 | 0.471 | 18 | 90 | 300 | 5.6 |
| EXAMPLE #4 | β | — | 4.71 | 0.471 | 0.471 | 10 | 100 | 300 | 5.4 |
| EXAMPLE #5 | β | Pd 0.5%, Ag 2.0%, P 0.1% | 4.71 | 0.471 | 0.471 | 24 | 80 | 300 | 5.8 |
| EXAMPLE #6 | β | Mg 0.01%, Ce 0.01% | 4.71 | 0.471 | 0.471 | 16 | 80 | 300 | 5.8 |
| EXAMPLE #7 | β | Ba 0.01%, La 0.01%, Zr 0.01% | 4.71 | 0.471 | 0.471 | 24 | 80 | 300 | 5.8 |
| EXAMPLE #8 | β | Ca 0.01%, Sr 0.01%, Y 0.01%, Nd 0.01% | 4.71 | 0.471 | 0.471 | 21 | 70 | 300 | 6.0 |
| EXAMPLE #9 | β | — | 4.71 | 0.471 | 0.471 | 24 | 80 | 300 | 5.8 |
| EXAMPLE #10 | β | — | 4.71 | 0.471 | 0.471 | 13 | 90 | 300 | 5.6 |
| EXAMPLE #11 | β | — | 4.71 | 0.471 | 0.471 | 12 | 60 | 300 | 4.5 |
| COMPARATIVE EXAMPLE #1 | β | — | 4.71 | 0.471 | 0.471 | 0 | 0 | 300 | 4.4 |
| COMPARATIVE EXAMPLE #2 | β | — | 4.71 | 0.471 | 0.471 | 3 | 20 | 300 | 6.4 |

FIG. 4

| | COLD HC AMOUNT AT LA-4 A-BAG (g/test) | COLD HC ADSORPTION AMOUNT (g/test) | DESORPTION PURIFICATION RATE (%) | COLD HC ADSORPTION RATE (%) |
|---|---|---|---|---|
| EXAMPLE #1 | 0.19 | 0.15 | 43 | 79 |
| EXAMPLE #2 | 0.19 | 0.15 | 44 | 79 |
| EXAMPLE #3 | 0.19 | 0.15 | 44 | 79 |
| EXAMPLE #4 | 0.19 | 0.16 | 41 | 84 |
| EXAMPLE #5 | 0.19 | 0.16 | 43 | 84 |
| EXAMPLE #6 | 0.19 | 0.16 | 42 | 85 |
| EXAMPLE #7 | 0.19 | 0.16 | 43 | 85 |
| EXAMPLE #8 | 0.19 | 0.14 | 40 | 74 |
| EXAMPLE #9 | 0.19 | 0.15 | 42 | 79 |
| EXAMPLE #10 | 0.19 | 0.15 | 43 | 79 |
| EXAMPLE #11 | 0.19 | 0.15 | 39 | 79 |
| COMPARATIVE EXAMPLE #1 | 0.19 | 0.15 | 21 | 79 |
| COMPARATIVE EXAMPLE #2 | 0.19 | 0.05 | 18 | 26 |

EXHAUST GAS PURIFYING CATALYST AND PROCESS FOR PREPARING THE CATALYST

BACKGROUND OF THE INVENTION

1. Field of the Invention

The present invention relates to a catalyst for purifying exhaust gases from an internal combustion engine of an automobile and a process for preparing the catalyst and, more particularly, an exhaust gas purifying catalyst for removing effectively a high concentration hydrocarbons exhausted in engine start-up, and a process for preparing the catalyst.

2. Description of the Related Art

In the prior art, for the purpose of purifying the exhaust gases from the internal combustion engine of the automobile, etc., a three-way catalyst has been employed. The three-way catalyst performs oxidation of carbon monoxide (CO) and hydrocarbons (HC) and reduction of nitrogen oxides (NOx) simultaneously.

In Japanese Laid-Open Patent publication Sho 58-20307 published in 1983, a three-way catalyst comprises an alumina coating layer formed on a refractory support and the layer carries noble metals such as palladium (Pd), platinum (Pt), rhodium (Rh), etc. Also another three-way catalyst is added a base metal oxide as an assistant catalyst component.

These three-way catalysts are strongly affected by the exhaust gas temperature and the air-fuel ratio (A/F). In order to make these three-way catalysts fulfill their purifying function effectively, the air-fuel ratio must be set in the vicinity of a stoichiometric air-fuel ratio (A/F=14.6) at which the oxidation of HC and CO and the reduction of NOx are balanced. Also, in order to make the three-way catalysts active, the exhaust gas temperature must be kept at 300° C. or more.

Therefore, in the prior art, when the three-way catalyst is fitted to a body of an automobile to purify exhaust gases, such three-way catalyst is positioned to receive the exhaust gases with the proper temperature. Also, feedback control is carried out to hold the mixed gas in the neighborhood of the stoichiometric air-fuel ratio by detecting the oxygen content in the exhaust system.

However, even if the three-way catalyst is positioned directly after an exhaust manifold of the engine, the temperature of the exhaust gases does not come up to 300° C. immediately after the engine start-up. A period in which the temperature of the exhaust gases is low in the engine start-up is called a "cold zone". In this cold zone, since a large quantity of HC is exhausted from the engine but the three-way catalyst is not active, such HC is not purified and thus exhausted as it is. Such HC generated in the cold zone is called a "cold HC".

Japanese Laid-Open Patent publications Hei 2-135126 published in 1990 and Hei 3-141816 published in 1991, disclose an exhaust gas purifying system for overcoming such "cold HC" problem. In this purifying system, an HC trapper in which an adsorbent is filled to adsorb HC being exhausted in the cold zone is arranged at the upstream of the flow of the exhaust gases before the three-way catalyst.

SUMMARY OF THE INVENTION

However, in the above exhaust gas purifying system equipped with the HC trapper, before the three-way catalyst arranged at the downstream side of the flow rather than the adsorbent can reach the active temperature, HC is desorbed from the HC trapper arranged at the upstream side of the flow. Therefore, the HC trapper cannot satisfactorily perform its HC trapping function. Further, since zeolite used as the adsorbent is dipped in a metal-based catalyst solution in a process of preparing the exhaust gas purifying system, the durability of the exhaust gas purifying system is insufficient.

Also, like the exhaust gas purifying system set forth in Japanese Laid-Open Patent publication Hei 3-141816 published in 1991, if desorption control of adsorbed HC is carried out by using a temperature sensor, a bypass pipe, a control unit, etc., the system becomes complicated in configuration to be lower reliability and thus an exhaust layout is not practical.

In view of these problems in the prior art, it is an object of the present invention to provide a more practical exhaust gas purifying catalyst capable of purifying effectively a high concentration HC being exhausted in the cold zone immediately after the engine start-up, and a process for preparing the catalyst.

In order to achieve the above object, according to an aspect of the exhaust gas purifying catalyst of the present invention, such exhaust gas purifying catalyst comprises a hydrocarbon adsorbent layer formed on a monolithic support to contain zeolite, and a metal-based catalyst layer formed on the hydrocarbon adsorbent layer to contain at least one type noble metal selected from the group consisting of palladium, platinum, and rhodium. Further, both layers contain an alkaline metal and/or an alkaline earth metal, and a weight ratio of the alkaline metal and/or the alkaline earth metal contained in the metal-based catalyst layer to the alkaline metal and/or the alkaline earth metal contained in the hydrocarbon adsorbent layer is set to 60:40 to 99:1.

According to another aspect of the exhaust gas purifying catalyst of the present invention, since such exhaust gas purifying catalyst of the present invention comprises the metal-based catalyst layer as the overlying layer and the hydrocarbon adsorbent layer as the underlying layer, it can have the function as the HC trapper and the function as the three way catalyst together, and can suppress desorption of HC trapped by the hydrocarbon adsorbent due to the presence of the metal-based catalyst layer to thus achieve the excellent HC trapping function.

Also, since the metal-based catalyst layer contains a sufficient amount of a alkaline metal and/or alkaline earth metal, it prevents degradation of the absorbing performance of the noble metals and improves the durability of the catalyst. In addition, since an amount of alkaline metal and/or alkaline earth metal in the hydrocarbon adsorbent layer is restricted, pores of the zeolite constituting the hydrocarbon adsorbent layer are not filled with the excessive alkaline metal and/or alkaline earth metal. Therefore the hydrocarbon adsorbent layer performs the high HC absorbing ability.

Meanwhile, when the exhaust gases containing $O_2$, HC, NOx flow into the catalyst of the present invention at the low temperature immediately after the engine start-up, etc., HC is adsorbed by the underlying hydrocarbon adsorbent layer and thus the $O_2$ partial pressure in the exhaust gases is increased. In this case, since the NOx adsorbing performance is in proportion to the $O_2$ partial pressure, adsorption of Nox is promoted in the overlying metal-based catalyst layer at this time. Accordingly, the cold HC and the unpurified Nox can be adsorbed at the same time by the catalyst of the present invention. After this, as the activation of the overlying metal-based catalyst layer having a three way purifying function is accelerated when the temperature of the exhaust gases becomes high, HC desorbs from the underlying hydrocarbon adsorbent layer and reacts with NOx adsorbed in the metal-based catalyst layer to be canceled with each other. As a result, the effective exhaust gas purification can be achieved.

According to an aspect of the process for preparing the exhaust gas purifying catalyst of the present invention, in order to prepare the catalyst of the present invention having above features, the metal-based catalyst layer is formed on the hydrocarbon adsorbent layer containing zeolite, by coating the slurry which contains at least one noble metal salt selected from the group consisting of palladium, platinum, and rhodium, and water insoluble or water hardly-soluble alkaline metal and/or alkaline earth metal salt.

Since the alkaline metal and/or the alkaline earth metal is mixed into the slurry in the form of water insoluble or water hardly-soluble alkaline metal and/or alkaline earth metal compound, dissolving-out of the alkaline metal and/or the alkaline earth metal into the slurry be limited. Therefore, diffusion of the alkaline metal into the zeolite as the hydrocarbon adsorbent layer having the strong water absorbing property is suppressed.

BRIEF DESCRIPTION OF THE DRAWINGS

FIG. 3 is a Table 1 showing compositions of the exhaust gas purifying catalysts and PH values of coating slurry of metal-based catalyst layers, that are prepared in examples in the present invention and comparative examples; and FIG. 4 is a Table 2 showing adsorbed amount, adsorption rate, and desorption purification rate of cold HC by the exhaust gas purifying catalysts that are prepared in examples in the present invention and comparative examples.

DESCRIPTION OF THE PREFERRED EMBODIMENTS

An exhaust gas purifying catalyst according to an embodiment of the present invention will be explained in detail hereinafter.

A basic configuration of the exhaust gas purifying catalyst according to the present embodiment comprises a monolithic support, a hydrocarbon adsorbent layer (referred to as a "HC adsorbent layer" hereinafter) formed on the monolithic support to contain a zeolite as a main component, and a metal-based catalyst layer formed on the HC adsorbent layer to contain predetermined noble metals and an alkaline metal and/or an alkaline earth metal.

Figure 1:
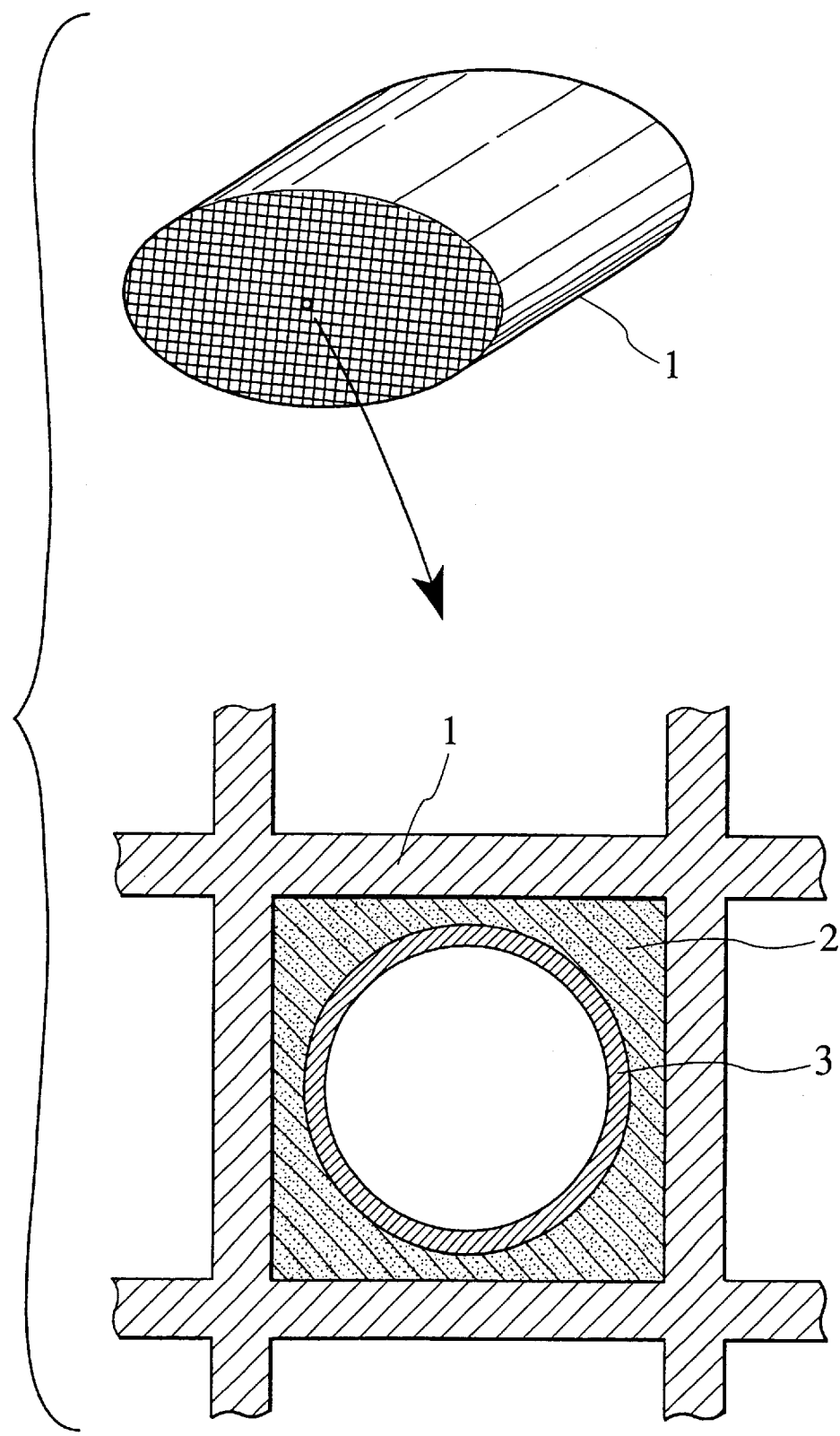
FIG. 1 is a perspective view showing an example of a configuration of an exhaust gas purifying catalyst according to an embodiment of the present invention, and a partial sectional view showing a part of the catalyst.

FIG. 1 shows an example of a configuration of the exhaust gas purifying catalyst according to the present embodiment. An outer perspective view of the exhaust gas purifying catalyst is illustrated on the upper side of FIG. 1, and an enlarged sectional view of a part of the exhaust gas purifying catalyst is illustrated on the lower side of FIG. 1. A large number of hollow cells, each has an almost square sectional shape, for example, are formed in a monolithic support 1. An HC adsorbent layer 2 is coated in the cell of the monolithic support 1, and a metal-based catalyst layer 3 is coated on the HC adsorbent layer 2.

The exhaust gases are purified by actions of the HC adsorbent layer 2 and the metal-based catalyst layer 3 in the course of the passing through the hollow portions of the cells.

The HC adsorbent layer 2 acts as an HC trapper. The metal-based catalyst layer 3 has both a function for adsorbing Nox and a function for purifying three types gases (HC, CO, NOx). As a result, the exhaust gas purifying catalyst according to the present embodiment fulfills functions of a three-way catalyst, and thus purifies the exhaust gases in not only the cold zone in the engine start-up but also the hot zone.

In addition, since the metal-based catalyst layer 3 suppress desorption of the adsorbed HC from the underlying HC adsorbent layer 2, it enhances an effect of the HC adsorbent layer 2 as an HC trapper.

A zeolite used as the HC adsorbent layer 2 may be selected appropriately from publicly known zeolites. In this case, it is preferable that such a zeolite should be selectively employed that has the sufficient HC adsorbing ability from the normal temperature to the relatively high temperature (e.g., 100° C. although the adsorptive temperature range is different according to evaluation conditions) in the moisture existing atmosphere and has long durability. For example, β-zeolite is preferable as such zeolite.

Pd, Pt or Rh, and any their mixed element may be listed as noble metals employed in the metal-based catalyst layer, and these noble metals fulfill the so-called three-way purifying function. In the present invention, it is desired to employ at least Pd.

In this manner, in the exhaust gas purifying catalyst according to the present embodiment, the β-zeolite is mainly employed as the zeolite in the HC adsorbent layer and also Pd is mainly employed as the noble metals in the metal-based catalyst layer.

Also, an alkaline metal and/or an alkaline earth metal are contained in the metal-based catalyst layer. As these materials, potassium, sodium, cesium, magnesium, calcium, strontium, or barium, and any their mixed compound are. exemplified. Particularly, barium is preferable as such metal.

The noble metals in the metal-based catalyst layer, especially Pd, are ready to cause sintering if they are repetitively used, so that the catalytic performance of the noble metals is readily deteriorated. The above alkaline metal or the alkaline earth metal prevents such sintering of the noble metals. Also, the alkaline metal or the alkaline earth metal function as Nox adsorbing material. Further, the alkaline metal or the alkaline earth metal alleviates the cold HC adsorption poisoning for the noble metals in the metal-based catalyst layer.

In the case that the normal method of manufacturing the exhaust gas purifying catalyst is applied to the alkaline metal or the alkaline earth metal in the metal-based catalyst layer, considerable alkaline metal or the like is diffused into the HC adsorbent layer during the manufacturing steps because of the moisture absorbing property of the zeolite.

However, it is preferable that the contained amount of the alkaline metal or the alkaline earth metal (ALM) in the HC adsorbent layer should be reduced to get a high absorbing ability of the HC absorbent layer. Therefore, it is preferable that a weight ratio of the ALM contained amount in the metal-based catalyst layer to the ALM contained amount in the HC adsorbent layer should be set to satisfy (ALM in the metal-based catalyst layer):(ALM in the HC adsorbent layer)=60:40 to 99:1.

If this ratio of the contained amount of the alkaline metal and/or the alkaline earth metal departs from the above range, pores in the HC adsorbent layer are blocked or filled by the alkaline metal and/or the alkaline earth metal. Thus, in some cases the cold HC adsorbing ability is lowered and the cold HC adsorption poisoning for the noble metals in the metal-based catalyst layer is not alleviated by the alkaline metal and/or the alkaline earth metal sufficiently.

More particularly, it is possible to say that, out of the catalysts in which the zeolite group HC adsorbent layer is arranged on the under layer and also the noble metal group three-way purifying layer is arranged on the upper layer, the exhaust gas purifying catalyst according to the present embodiment corresponds to such a catalyst that the contained amount of the alkaline metal and/or the alkaline earth metal in the HC adsorbent layer can be controlled considerably small (up to a rate of 0 to 20 weight % of the overall catalyst).

In this way, in the exhaust gas purifying catalyst according to the present embodiment, the Nox adsorption appearing lower limit temperature of 250° C. in the normal Nox adsorbing catalyst can be improved up to about 150° C. by controlling the contained amount of the alkaline metal and/or the alkaline earth metal. Thus, the excellent Nox adsorption property in the cold zone rather than the catalyst in the prior art can be achieved.

The above-mentioned exhaust gas purifying catalyst in which the contained amount of the alkaline metal and/or the alkaline earth metal is controlled can be accomplished according to the following manufacturing method. Such manufacturing method will be explained hereinafter.

Basically, first an aqueous slurry containing constituent components of the HC adsorbent layer and aqueous slurry containing constituent components of the metal-based catalyst layer are prepared respectively. Then, the aqueous slurry for forming the HC adsorbent layer is coated over the honeycomb monolithic support, then dried, and then baked. Then, the aqueous slurry for forming the metal-based catalyst layer is coated thereon, then dried, and then baked.

In the manufacturing method according to the present embodiment, the alkaline metal and/or the alkaline earth metal being mixed into the aqueous slurry for forming the above metal-based catalyst layer is supplied in the form of either a water insoluble metal salt or a water hardly-soluble compound.

Like the normal manufacturing method, in the case that the alkaline metal and/or the alkaline earth metal is mixed into the slurry for the metal-based catalyst layer in the form of water soluble compound, most portion of the alkaline metal and/or the alkaline earth metal is diffused into the HC adsorbent layer, because of the high water absorbing property of the zeolite serving as the HC adsorbent layer.

Also, if the alkaline metal and/or the alkaline earth metal is water-soluble, increase of a viscosity of the slurry is brought about and adhesiveness of the coat layer is weakened since the alkaline metal and/or the alkaline earth metal is easily dissolved into the slurry.

However, if the alkaline metal and/or the alkaline earth metal is added into the slurry for the metal-based catalyst layer in the form of the water insoluble compound or the water hardly-soluble compound, the exhaust gas purifying catalyst according to the present embodiment, which is capable of not only suppressing or avoiding the diffusion of the alkaline metal and/or the alkaline earth metal into the HC adsorbent layer but also adjusting the contained amount of the alkaline metal, etc., as mentioned above, can be prepared.

As the water insoluble or hardly-soluble compound of the alkaline metal and/or the alkaline earth metal, carbonate such as magnesium carbonate, strontium carbonate, barium carbonate, etc. and sulfate such as barium sulfate, etc. can be given as examples.

It is desired that, in order to prevent gelling of the slurry and stabilize the slurry, a slurry solution for the metal-based catalyst layer should be ionized by mixing an acid such as a nitric acid, etc. into the slurry. Thus, a relatively strong acid solution having PH 4 or less is employed as the slurry solution in the prior art. However, if PH of the slurry is low as in the above, the carbonate and the sulfate that are essentially insoluble into the water are dissolved into the slurry. As a result, the alkaline metal and/or the alkaline earth metal dissolved into the slurry brings about the increase of the viscosity of the slurry or the degradation of the adhesiveness of the coat layer. In addition, the alkaline metal and/or the alkaline earth metal being dissolved out are diffused into the HC adsorbent layer.

Accordingly, it is desired that the PH of the slurry for the metal-based catalyst layer should be set as high as possible within the range that can attain stabilization of the slurry. That is, PH of the slurry should be set to more than or equal to 4.5, preferably 5 to 6. If the PH of slurry is adjusted within this range, not only stabilization of Pd in the metal-based catalyst layer but also suppression of the diffusion of the alkaline metal and/or the alkaline earth metal into the HC adsorbent layer can be achieved.

As the zeolite in the HC adsorbent layer according to the present embodiment, preferably β-zeolite, especially H-type β-zeolite whose Si/2Al ratio is set to 10 to 500, should be employed. If the Si/2Al ratio of the β-zeolite is less than 10, adsorption interference by moisture in the exhaust gases is increased and thus sometimes the zeolite cannot effectively adsorb the HC. In contrast, if the Si/2Al ratio of the β-zeolite is in excess of 500, sometimes the HC adsorbing ability is lowered.

Since various kinds of HC are contained in the exhaust gases exhausted from the engine, the HC contained in the exhaust gases can be effectively adsorbed if MFI-type zeolite, Y-type zeolite, USY-type zeolite, or mordenite, all having a different diameter of the pore and having a different porous structure, and any their mixed material are employed in combination.

The above various zeolites have a sufficient HC adsorbing ability if the H-type zeolites are employed. If palladium (Pd), magnesium (Mg), calcium (Ca), strontium (Sr), barium (Ba), silver (Ag), yttrium (Y), lanthanum (La), cerium (Ce), neodymium (Nd), phosphorus (P), boron (B), or zirconium (Zr), and any their mixture may be added to the H-type zeolite by an ordinary method such as the ion-exchange method, the impregnation method, the dipping method, etc., it is possible to improve much more the adsorption performance and the desorption suppressing ability.

Both zirconium oxide which contains celium, neodymium, or lanthanum, and any their mixed element by 1 to 40 mol % in terms of metal, and rhodium may be contained in the metal-based catalyst layer. Thus, the metal-based catalyst layer gets the desorbed HC purifying performance. As a result, an HC purifying efficiency of the exhaust gas purifying catalyst is improved further more.

Also, alumina which contains at least one of cerium, zirconium, or lanthanum, and their mixed element by 1 to 10 mol % in terms of metal, and cerium oxide which contains zirconium, neodymium, or lanthanum, and their mixed element by 1 to 40 mol % in terms of metal may be added in the metal-based catalyst layer. The low temperature activity of the metal-based catalyst layer, and the catalytic activity and durability of the metal-based catalyst layer under the stoichiometric atmosphere is improved.

Furthermore, zirconium oxide that contains at least one of cerium, zirconium, or lanthanum, and their mixed element by 1 to 40 mol % in terms of metal in the metal-based catalyst layer may be added in the metal-based catalyst layer. Thus, the catalytic activity of the catalyst in the atmosphere in which the fuel is rich is further improved.

As described above, the exhaust gas purifying catalyst according to the present invention is constructed by coating the HC adsorbing layer and the metal-based catalyst layer on the monolithic support. In this case, it is preferable that the honeycomb-like monolithic support consisting of heat resistant material or the metal support should be employed as such monolithic support.

In particular, if the honeycomb-like support 1 shown in FIG. 1 is employed upon purifying the exhaust gases exhausted from automobiles, contact area between the catalyst and the exhaust gases is so large and also the pressure loss can be suppressed. In addition, the honeycomb-like support can be proof much more against the vibration and the friction. Therefore, the exhaust gas purifying catalyst according to the present embodiment can serve more effectively.

Normally, cordierite material such as ceramic, or the like is often employed as the honeycomb-like support. The honeycomb-like support consisting of metal material such as ferritic stainless steel, etc. may be employed, and also catalyst material powder per se may be formed into the honeycomb-like shape.

Further, in the present invention, in order to cause the exhaust gas purifying catalyst to achieve sufficiently a purifying function, for example, a monolithic support may be constructed by impregnating various catalyst components into the porous base material such as alumina.

It is preferable that such porous base material has high heat resistance. Especially, the activated alumina whose specific surface area is about 50 to 300 $m^2/g$ is preferable.

Figure 2:
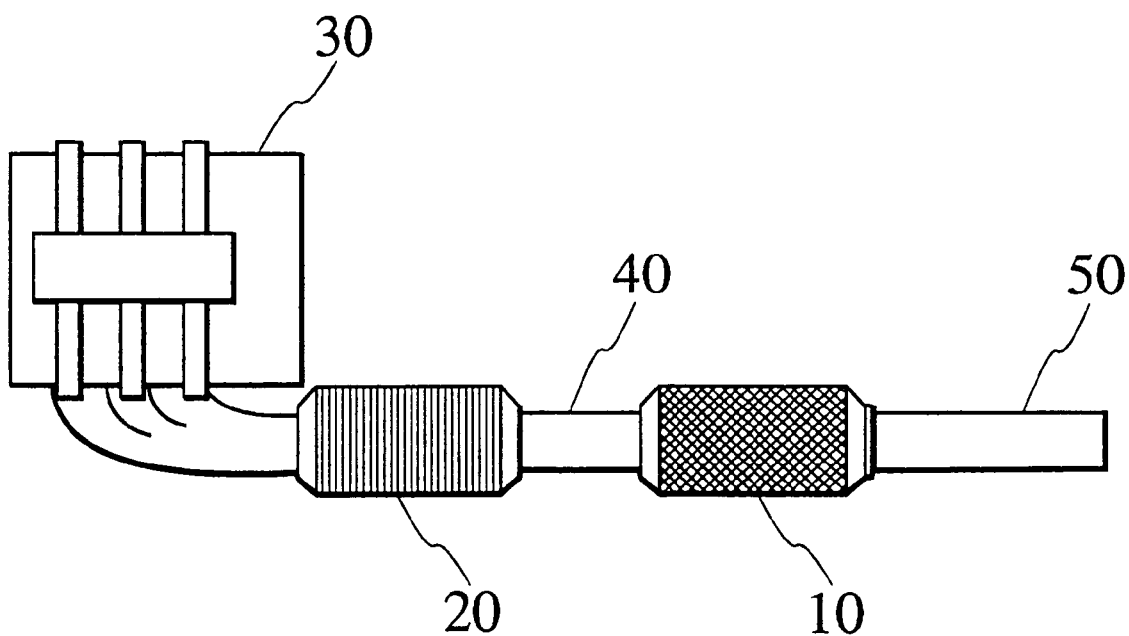
FIG. 2 is a side view showing a preferred application mode of the exhaust gas purifying catalyst according to the present invention.

FIG. 2 is a side view showing a preferred application mode of the exhaust gas purifying catalyst according to the present embodiment. The exhaust gas purifying catalyst 10 according to the present embodiment may be used singly, however, it is preferable that, as shown in FIG. 2, a normal three way catalyst 20 is arranged on the upstream side of an exhaust gas pipe 40 from an engine 30 and then the exhaust gas purifying catalyst 10 according to the present embodiment is arranged on the downstream side. In this case, the exhaust gas purifying catalyst 10 can exhibit excellent adsorbing/purifying performance of HC and Nox in the cold zone, and thus an exhaust gas purifying efficiency can be improved. The reason for this is given as follows.

In order to activate quickly the three way catalyst arranged in the exhaust gas pipe 40, it is desired that the air-fuel ratio immediately after the engine start-up should be set from the stoichiometric to the lean fuel range as quickly as possible. In this case, if the air-fuel ratio is set from the stoichiometric to the lean range at a low temperature at which the activity of the three-way catalyst is insufficient, unpurified Nox is exhausted as it is.

In the application mode shown in FIG. 2, since the exhaust gas purifying catalyst 10 according to the present embodiment is arranged on the downstream side of the three way catalyst 20, HC and unpurified Nox discharged from the three way catalyst 20 in the cold zone can be adsorbed simultaneously by the exhaust gas purifying catalyst 10 according to the present embodiment, so that unpurified Nox is seldom exhausted. Subsequently, after catalytic metal layers in the upstream three way catalyst 20 and the exhaust gas purifying catalyst 10 are activated, the purifying process is performed while discharging adsorbed HC and NOx simultaneously to react with each other. As a result, the excellent exhaust gas purifying efficiency can be achieved.

In the exhaust gas purifying catalyst system in the prior art, since HC component lacks on the downstream side after the upstream three way catalyst is activated, the downstream three way catalyst that has adsorbed Nox cannot sufficiently purify the adsorbed NOx. In contrast, in the application mode shown in FIG. 2, since the HC component necessary for the purification of the adsorbed Nox is assured in the HC adsorbent layer, the purification of the adsorbed Nox becomes sufficient.

Examples of the exhaust gas purifying catalyst according to the present embodiment and comparative examples will be explained hereinafter.

EXAMPLE #1

The slurry for the HC adsorbent layer is prepared by introducing β-zeolite powder (H type, Si/2Al=28) of 800 g, silica gel (20% solid content) of 1000 g, and a pure water of 1800 g into a magnetic ball mill, and then crushing the mixture. This slurry is coated on the cordierite monolithic support (300 cells/6 mills), then dried after excessive slurry in the cells was removed by an air flow, and then baked at 400° C. for one hour. A catalytic layer A acting as the HC adsorbent layer is formed by repeating the coating operation after the baking until 200 g/L can be obtained as the coated amount at this time.

The Pd-impregnated alumina powder (powder I) is prepared by impregnating the alumina powder containing 2 mol % La and 3 mol % Zr with a palladium dinitrodiamine aqueous solution or spraying the aqueous solution while stirring the alumina powder at a high speed, then drying the resultant at 150° C. for twenty four hours, and then baking the resultant at 400° C. for one hour and then at 600° C. for one hour. A Pd concentration in this powder I is 8.0 weight %.

The Pd-impregnated cerium oxide powder (powder II) is prepared by impregnating the cerium oxide powder containing 1 mol % La and 32 mol % Zr with the palladium dinitrodiamine aqueous solution or spraying the aqueous solution while stirring the cerium oxide powder at a high speed, then drying the resultant at 150° C. for twenty four hours, and then baking the resultant at 400° C. for one hour and then at 600° C. for one hour. A Pd concentration in this powder II is 2.0 weight %.

The Rh-impregnated alumina powder (powder III) is prepared by impregnating the alumina powder containing 3 weight % Zr with the rhodium nitrate aqueous solution or spraying the aqueous solution while stirring the alumina powder at a high speed, then drying the resultant at 150° C. for twenty four hours, and then baking the resultant at 400° C. for one hour and then at 600° C. for one hour. A Pd concentration in this powder III is 2.0 weight %.

The Pt-impregnated alumina powder (powder IV) is prepared by impregnating the alumina powder containing 1 mol % La and 3 mol % Zr with the platinum dinitrodiamine aqueous solution or spraying the aqueous solution while stirring the alumina powder at a high speed, then drying the resultant at 150° C. for twenty four hours, and then baking the resultant at 400° C. for one hour and then at 600° C. for one hour. A Pt concentration in this powder IV is 2.0 weight %.

Then, the slurry for the metal-based catalyst layer is prepared by introducing the Pd-impregnated alumina powder (powder I) of 559 g, the Pd-impregnated cerium oxide powder (powder II) of 118 g, the Rh-impregnated alumina powder (powder III) of 236 g, the Pt-impregnated alumina powder (powder IV) of 236 g, alumina sol of 510 g (sol containing the 10 weight % solid content), barium carbonate of 386 g, and a pure water of 2000 g into the magnetic ball mill and then crushing the mixture. PH of the slurry is 5.8. This slurry is coated on the above catalyst layer A, then dried after excessive slurry in the cells is removed by an air flow, and then baked at 400° C. for one hour. A catalytic layer B acting as the metal-based catalyst layer is formed by coating the slurry up to a coating layer weight 150 g/L.

The exhaust gas purifying catalyst prepared by using the above manufacturing method comprises the HC adsorbent layer (catalyst layer A) formed of the β-zeolite and the metal-based catalyst layer (catalyst layer B) formed on the HC adsorbent layer in the cordierite monolithic support. The metal-based catalyst layer contains Pd, Pt and Rh as the noble metals. The HC adsorbent layer and the metal-based catalyst layer contain barium as the alkaline metal. A weight ratio of barium in the HC adsorbent layer to barium in the metal-based catalyst layer is 20:80.

EXAMPLE #2

As the zeolite added to the slurry for the HC adsorbent layer, the β-zeolite powder (H type, Si/2Al=150) is used. Other conditions are set to the same conditions as the EXAMPLE #1, and the exhaust gas purifying catalyst is prepared. PH of the slurry for the metal-based catalyst layer is 5.6. A weight ratio of barium in the HC adsorbent layer to barium in the metal-based catalyst layer is 10:90.

EXAMPLE #3

As the zeolite added to the slurry for the HC adsorbent layer, the β-zeolite powder (H type, Si/2Al=75) of 700 g, MFI (ZSM5) powder of 50 g, and USY powder of 50 g are used. Other conditions are set to the same conditions as the EXAMPLE #1, and the exhaust gas purifying catalyst is prepared. PH of the slurry for the metal-based catalyst layer is 5.6. A weight ratio of barium in the HC adsorbent layer to barium in the metal-based catalyst layer is 10:90.

EXAMPLE #4

As the zeolite added to the slurry for the HC adsorbent layer, the β-zeolite powder (H type, Si/2Al=75) of 700 g, Y-type zeolite powder of 50 g, and mordenite powder of 50 g are used. Other conditions are set to the same conditions as the EXAMPLE #1, and the exhaust gas purifying catalyst is prepared. PH of the slurry for the metal-based catalyst layer is 5.4. A weight ratio of barium in the HC adsorbent layer to barium in the metal-based catalyst layer is 0:100.

EXAMPLE #5

As the zeolite added to the slurry for the HC adsorbent layer, the β-zeolite powder (H type, Si/2Al=75) of 700 g containing 0.5 weight % Pd, 2.0 weight % Ag, and 0.1 weight % P, is used. Other conditions are set to the same conditions as the EXAMPLE #1, and the exhaust gas purifying catalyst is prepared. PH of the slurry for the metal-based catalyst layer is 5.8. A weight ratio of barium in the HC adsorbent layer to barium in the metal-based catalyst layer is 20:80.

EXAMPLE #6

As the zeolite added to the slurry for the HC adsorbent layer, the β-zeolite powder (H type, Si/2Al=75) containing 0.01 weight % Mg and 0.01 weight % Ce, is used. Other conditions are set to the same conditions as the EXAMPLE #1, and the exhaust gas purifying catalyst is prepared. PH of the slurry for the metal-based catalyst layer is 5.8. A weight ratio of barium in the HC adsorbent layer to barium in the metal-based catalyst layer is 20:80.

EXAMPLE #7

As the zeolite added to the slurry for the HC adsorbent layer, the β-zeolite powder (H type, Si/2Al=75) containing 0.01 weight % Ba, 0.01 weight %; La and 0.01 weight % Zr, is used. Other conditions are set to the same conditions as the EXAMPLE #1, and the exhaust gas purifying catalyst is prepared. PH of the slurry for the metal-based catalyst layer is 5.8. A weight ratio of barium in the HC adsorbent layer to barium in the metal-based catalyst layer is 20:80.

EXAMPLE #8

As the zeolite added to the slurry for the HC adsorbent layer, the β-zeolite powder (H type, Si/2Al=75) containing 0.01 weight % Ca, 0.01 weight % Sr, 0.01 weight % Y, 0.01 weight % Nd and 0.1 weight % B, is used. Other conditions are set to the same conditions as the EXAMPLE #1, and the exhaust gas purifying catalyst is prepared. PH of the slurry for the metal-based catalyst layer is 6.0. A weight ratio of barium in the HC adsorbent layer to barium in the metal-based catalyst layer is 30:70.

EXAMPLE #9

In place of the Rh-impregnated alumina powder (powder III) added to the slurry for the metal-based catalyst layer, the powder in which the zirconium oxide containing 10 mol % Ce and 5 mol % Nd is impregnated with Rh is used. Other conditions are set to the same conditions as the EXAMPLE #1, and the exhaust gas purifying catalyst is prepared. PH of the slurry for the metal-based catalyst layer is 5.8. A weight ratio of barium in the HC adsorbent layer to barium in the metal-based catalyst layer is 20:80.

EXAMPLE #10

In place of barium carbonate added to the slurry for the metal-based catalyst layer, calcium carbonate is used. Other conditions are set to the same conditions as the EXAMPLE #1, and the exhaust gas purifying catalyst is prepared. PH of the slurry for the metal-based catalyst layer is 5.6. A weight ratio of calcium in the HC adsorbent layer to calcium in the metal-based catalyst layer is 10:90.

EXAMPLE #11

The slurry for the metal-based catalyst layer is controlled to make the value of PH of the slurry set to 4.5. Other conditions are set to the same conditions as the EXAMPLE #1, and the exhaust gas purifying catalyst is prepared. A weight ratio of barium in the HC adsorbent layer to barium in the metal-based catalyst layer is 40:60.

COMPARATIVE EXAMPLE #1

The exhaust gas purifying catalyst is prepared under the same conditions as the EXAMPLE #1 other than that barium carbonate is not added to the slurry for the metal-based catalyst layer. PH of the slurry for the metal-based catalyst layer is 4.4.

COMPARATIVE EXAMPLE #2

Barium carbonate is not added to the slurry for the metal-based catalyst layer. Allternatively, after the catalyst layer B is formed, such catalyst layer B is impregnated with barium using barium acetate. PH of the slurry for the metal-based catalyst layer is 6.4. A weight ratio of barium in the HC adsorbent layer to barium in the metal-based catalyst layer is 80:20.

Specifications of the exhaust gas purifying catalysts obtained by the above examples in the present invention and comparative examples are given in Table 1. Also, the HC purification performance (A-bag in a LA-4) of the catalysts prepared by the examples in the present invention and comparative examples is evaluated under following conditions. This evaluation is performed under the condition of catalyst arrangement as showing FIG. 2. The results are shown in Table 2.

Endurance Conditions

The endurance test is applied to the catalysts prepared by the examples and comparative examples under following conditions.

Engine exhaust amount: 3000 cc

Fuel gasoline: Nisseki dash gasoline (Pb=0 mg/usg, S=30 ppm or less)

Catalyst inlet gas temperature: 650° C.

Test period: 100 hours

Performance Evaluation Conditions

Catalyst capacity for one bank: three-way catalyst 1.3 liter (catalysts of EXAMPLEs #1 to #11 or COMPARATIVE EXAMPLEs #1, #2 are 1.3 liter)

Test vehicle: in-line 4 cylinder 2.4 liter engine manufactured by Nissan Motor Co. Ltd.

Carbon number of the hydrocarbons discharged in the engine start-up (contained in the catalyst inlet gas)
C2–C3 21.0%
C4–C6 33.0%
C7–C9 40.0%

In Table 2, the "desorption purification rate (DPR)" is defined by the following expression:

$$DPR(\%) = ((HCad.) - (HCun.))/(HCad.) \times 100$$

Where "HCad." is "weight of adsorbed cold HC" and "HCun." is "weight of unpurified cold HC". "HCad." and "HCun." are defined by the following expressions:

HCad.=(weight of gases emitted from the catalyst 20 during the cold zone)—(weight of gases emitted from the tailpipe during a cold zone)

HCun.=(weight of gases emitted from the tailpipe 50 after the cold zone)−(weight of gases emitted from the catalyst 20 after the cold zone)

As shown in Table 1 and Table 2, since the catalysts prepared by EXAMPLEs #1 to #11 contain 60 weight % or more of all addition amount of Ba (alkaline earth metal) in the metal-based layers (overlying layer), thermal degradation of Pd in the metal-based catalyst layer can be reduced and thus the catalysts can exhibit excellent durability. In contrast, since Ba in the metal-based catalyst layer of the catalysts prepared by COMPARATIVE EXAMPLEs #1 and #2 is less than 60 weight % of all addition amount of Ba, durability is not good.

As shown in Table 2, in this performance evaluation test, HC of 0.19 g in the cold zone (cold HC) is exhausted every test. The exhaust gas purifying catalysts prepared by EXAMPLEs #1 to #11 can adsorb the cold HC of 0.14 to 0.16 g, i.e., about 74 to 85% of the cold HC per one test, and thus the exhaust gases can be purified effectively at a desorption purification rate of more than 40%.

On the contrary, in COMPARATIVE EXAMPLEs #1, since the alkaline earth metal is not contained in the metal-based catalyst layer (overlying layer), the desorption purification rate is halved. In COMPARATIVE EXAMPLEs #2, since the alkaline earth metal added to the metal-based catalyst layer (overlying layer) is 20 weight % of all addition amount, an adsorption rate and the desorption purification rate of the cold HC is extremely reduced.

As explained above, since the exhaust gas purifying catalyst according to the present embodiment has a multi-layered structure in which the metal-based catalyst layer containing the noble metals and the alkaline metal or the alkaline earth metal is laminated on the HC adsorbent layer such that the contained amount of the alkaline metal or the alkaline earth metal in both catalyst layers can be controlled, the present invention can provide the exhaust gas purifying catalyst capable of purifying effectively the high concentration HC being exhausted in the cold zone immediately after the engine start-up and thus capable of purifying effectively the exhaust gases, and a process for preparing the catalyst.

Moreover, if the exhaust gas purifying catalyst according to the present embodiment is utilized together with the normal three-way catalyst, the exhaust gas purifying process can be accomplished more effectively from the engine start-up.

The entire contents of Japanese Patent Applications Hei11-224600 (filed Aug. 6, 1999), P2000-205381 (filed Jul. 6, 2000) and U.S. Pat. No. 6,047,544 are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. An exhaust gas purifying catalyst comprising:
    a monolithic support;
    a hydrocarbon adsorbent layer formed on the monolithic support, and containing zeolite as a main component and a second component comprising an alkaline metal and/or an alkaline earth metal;
    a metal-based catalyst layer formed on the hydrocarbon adsorbent layer, and containing at least one type noble metal selected from the group consisting of palladium, platinum and rhodium, and the second component;
    wherein a weight ratio of the second component contained in the metal-based catalyst layer to the second component contained in the hydrocarbon adsorbent layer is set to 60:40 to 99:1.

2. The exhaust gas purifying catalyst of claim 1, wherein the zeolite contained in the hydrocarbon adsorbent layer contains β-zeolite, and the metal-based catalyst layer contains palladium as the noble metal.

3. The exhaust gas purifying catalyst of claim 1, wherein the zeolite contained in the hydrocarbon adsorbent layer contains H-type β-zeolite whose Si/2Al ratio is 10 to 500.

4. The exhaust gas purifying catalyst of claim 1, wherein the zeolite contained in the hydrocarbon adsorbent layer contains
    an H-type β-zeolite, and
    at least one selected from the group consisting of MFI-type zeolite, Y-type zeolite, USY-type zeolite, and mordenite.

5. The exhaust gas purifying catalyst of claim 1, wherein the zeolite contained in the hydrocarbon adsorbent layer contains at least one element selected from the group consisting of palladium, magnesium, calcium, strontium, barium, silver, yttrium, lanthanum, cerium, neodymium, phosphorus, boron, and zirconium.

6. The exhaust gas purifying catalyst of claim 1, wherein the hydrocarbon adsorbent layer contains rhodium, and zirconium oxide containing at least one element selected from the group consisting of cerium, neodymium, and lanthanum by 1 to 40 mol % in terms of metal.

7. The exhaust gas purifying catalyst of claim 1, wherein the metal-based catalyst layer further contains alumina containing at least one element selected from the group consisting of cerium, zirconium, and lanthanum by 1 to 10 mol % in terms of metal, and cerium oxide containing at least one element selected from the group consisting of zirconium, neodymium, and lanthanum by 1 to 40 mol % in terms of metal.

8. The exhaust gas purifying-catalyst of claim 1, wherein the metal-based catalyst layer further contains zirconium oxide containing at least one element selected from the group consisting of cerium, neodymium, and lanthanum in an amount in the range of 1 to 40 mol % in terms of metal.

9. An exhaust gas purifying catalyst comprising:

a monolithic support;

a hydrocarbon adsorbent layer formed on the monolithic support, and containing zeolite as a main component and a second component comprising an alkaline metal and/or an alkaline earth metal;

a metal-based catalyst layer formed on the hydrocarbon adsorbent layer, and containing at least one type of noble metal selected from the group consisting of palladium, platinum and rhodium, and the second component;

wherein a weight ratio of the second component contained in the metal-based catalyst layer to the second component contained in the hydrocarbon adsorbent layer is set to 60:40 to 99:1;

the metal-based catalyst layer is formed by a process comprising coating an aqueous slurry on the hydrocarbon adsorbent layer and baking the coated slurry, and the second component is contained in the hydrocarbon adsorbent layer and the metal-based catalyst layer by adding into the aqueous slurry in form of a water insoluble or water hardly-soluble alkaline metal and/or alkaline earth metal compound.

10. A process for preparing an exhaust gas purifying catalyst, comprising:

forming a hydrocarbon adsorbent layer containing zeolite as a main component and a second component comprising an alkaline metal and/or alkaline earth metal on a monolithic support;

preparing a slurry by mixing at least one noble metal salt selected from the group consisting of palladium, platinum and rhodium, and a salt of the second component, in which the salt of the second component is water insoluble or water hardly soluble;

coating the slurry on the hydrocarbon adsorbent layer; and baking the coated slurry to obtain a metal-based catalyst layer, wherein after the baking process, a weight ratio of the second component contained in the metal-based catalyst layer to the second component contained in the hydrocarbon adsorbent layer is set to 60:40 to 99:1.

11. The process of claim 10, wherein the slurry is adjusted at a PH value which maintains its flowability stably.

12. The process of claim 11, wherein the PH value is more than or equal to 4.5.

13. The process of claim 11, wherein the PH value is set to 4.5 to 6.

14. The process of claim 10, wherein the water soluble or water hardly-soluble salt of the second component is carbonate.

15. The process of claim 14, wherein the carbonate is at least one of barium carbonate, calcium carbonate and magnesium carbonate.

* * * * *